(12) United States Patent
Subrahmanya et al.

(10) Patent No.: US 12,088,465 B2
(45) Date of Patent: Sep. 10, 2024

(54) METHODS AND SYSTEMS FOR UPGRADING A CONTROL PLANE AND A DATA PLANE OF A NETWORK APPLIANCE

(71) Applicant: Pensando Systems Inc., Milpitas, CA (US)

(72) Inventors: Sameer Kittur Subrahmanya, Fremont, CA (US); Krishna Doddapaneni, Cupertino, CA (US)

(73) Assignee: Pensando Systems Inc., Milpitas, CA (US)

( * ) Notice: Subject to any disclaimer, the term of this patent is extended or adjusted under 35 U.S.C. 154(b) by 433 days.

(21) Appl. No.: 17/573,547

(22) Filed: Jan. 11, 2022

(65) Prior Publication Data
US 2023/0224217 A1 Jul. 13, 2023

(51) Int. Cl.
*H04L 41/082* (2022.01)
*H04L 41/12* (2022.01)
*H04L 49/00* (2022.01)

(52) U.S. Cl.
CPC ............ *H04L 41/082* (2013.01); *H04L 41/12* (2013.01); *H04L 49/3063* (2013.01)

(58) Field of Classification Search
CPC ....... H04L 45/38; H04L 41/082; H04L 41/12; H04L 49/3063
See application file for complete search history.

(56) References Cited

U.S. PATENT DOCUMENTS

| 5,577,528 A * | 11/1996 | Saha ................... F16L 55/18 |
| | | 156/499 |
| 8,867,361 B2 | 10/2014 | Kempf et al. |
| 8,949,818 B2 | 2/2015 | Chhabra |
| 2017/0083449 A1 * | 3/2017 | Potash ................... G06F 8/41 |
| 2018/0278496 A1 * | 9/2018 | Kulshreshtha .......... H04L 43/04 |
| 2018/0287907 A1 * | 10/2018 | Kulshreshtha .......... H04L 43/04 |
| 2020/0104164 A1 * | 4/2020 | Pawlowski ........... G06F 9/3824 |
| 2020/0296007 A1 * | 9/2020 | Finn ..................... H04L 41/145 |

OTHER PUBLICATIONS

P4, "P416 Language Specification; version 1.2.2", The P4 Language Consortium, May 17, 2021, 170 pgs.
P4, "P4 Language Tutorial", (2017), 55 pgs.
Sivaraman, Anirudh et al. "DC.p4: Programming the Forwarding Plane of a Data-Center Switch", SOSR 2015, Jun. 17-18, 2015, Santa Clara, CA, USA, 8 pgs.

* cited by examiner

*Primary Examiner* — Brian D Nguyen
(74) *Attorney, Agent, or Firm* — LOZA & LOZA, LLP

(57) ABSTRACT

A network appliance can continue operation at a degraded level during an upgrade that requires less free pipeline memory than other upgrade techniques. The network appliance has a control plane and has a data plane with a packet processing pipeline circuit. Before the upgrade, the control plane has configured the packet processing pipeline circuit to process a network flow. The packet processing pipeline may be halted in order to perform a pipeline upgrade during which the packet processing pipeline circuit's pipeline memory is cleared. The packet processing pipeline circuit is restarted after the pipeline upgrade after which the control plane can reconfigure the packet processing pipeline circuit to process the network flow. The packet processing pipeline circuit can therefore process the network flow after the pipeline upgrade.

20 Claims, 14 Drawing Sheets

METHODS AND SYSTEMS FOR UPGRADING A CONTROL PLANE AND A DATA PLANE OF A NETWORK APPLIANCE

TECHNICAL FIELD

The embodiments relate to computer networks, local area networks, network appliances such as routers, switches, network interface cards (NICs), smart NICs, and distributed service cards (DSCs). The embodiments also relate to packet processing pipelines, application specific integrated circuits implementing packet processing pipelines, and to providing network services and processing the packets of network flows at the same time as performing an upgrade of data plane elements such as packet processing pipeline circuits.

BACKGROUND

Network appliances process network traffic flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The P4 domain-specific language for programming the data plane of network appliances is currently defined in the "P416 Language Specification," version 1.2.2, as published by the P4 Language Consortium on May 17, 2021, which is incorporated by reference herein. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a method. The method can include configuring a packet processing pipeline circuit to process a network flow by writing a network flow configuration data for the network flow into a table, halting the packet processing pipeline circuit in order to perform a pipeline upgrade after the packet processing pipeline circuit is configured to process the network flow, performing the pipeline upgrade after halting the packet processing pipeline circuit, clearing the table while performing the pipeline upgrade, restarting the packet processing pipeline circuit after performing the pipeline upgrade, and reconfiguring the packet processing pipeline circuit to process the network flow by writing the network flow configuration data into the table after performing the pipeline upgrade, wherein clearing the table causes the packet processing pipeline circuit to lose configuration for processing the network flow.

Another aspect of the subject matter described in this disclosure can be implemented as a network appliance. The network appliance can include a control plane that includes a plurality of CPU cores, and a data plane that includes a packet processing pipeline circuit, wherein the control plane configures the packet processing pipeline circuit to process a network flow by writing a network flow configuration data for the network flow into a table, the control plane halts the packet processing pipeline circuit in order to perform a pipeline upgrade, the control plane performs the pipeline upgrade while the packet processing pipeline circuit is halted, the pipeline upgrade includes clearing the table, the control plane restarts the packet processing pipeline circuit after performing the pipeline upgrade, the control plane reconfigures the packet processing pipeline circuit to process the network flow after performing the pipeline upgrade, the pipeline upgrade is performed after the packet processing pipeline circuit is configured to process the network flow, and clearing the table causes the packet processing pipeline circuit to lose configuration for processing the network flow.

Yet another aspect of the subject matter described in this disclosure can be implemented in a system. The system can include a pipeline configuration means for configuring a packet processing pipeline circuit to process a network flow, a pipeline upgrade means for performing a pipeline upgrade that upgrades the packet processing pipeline circuit, a means for halting the packet processing pipeline circuit while performing the pipeline upgrade, and a means for restarting the packet processing pipeline circuit after performing the pipeline upgrade, wherein the pipeline configuration means configures the packet processing pipeline circuit to process the network flow before the pipeline upgrade is performed, performing the pipeline upgrade results in the packet processing pipeline circuit being not configured to process the network flow, and the pipeline configuration means reconfigures the packet processing pipeline circuit to process the network flow after the pipeline upgrade is performed.

In some implementations of the methods and devices, a network appliance includes the packet processing pipeline circuit and a control plane, the network appliance receives a pre-upgrade packet of the network flow, the control plane produces flow processing data by applying a plurality of networking rules to the pre-upgrade packet, and the control plane uses the flow processing data to configure the packet processing pipeline circuit to process the network flow before performing the pipeline upgrade. In some implementations of the methods and devices, the network appliance receives an interim packet after performing the pipeline upgrade and before performing a control plane upgrade, and the control plane uses the flow processing data to process the interim packet. In some implementations of the methods and devices, the control plane uses the flow processing data to reconfigure the packet processing pipeline circuit to process the network flow after performing the pipeline upgrade. In some implementations of the methods and devices, after performing the pipeline upgrade, the control plane produces post-upgrade flow processing data by applying the networking rules to a post-upgrade packet of the network flow, and the control plane uses the post-upgrade flow processing data to reconfigure the packet processing pipeline circuit to process the network flow. In some implementations of the methods and devices, the control plane uses the post-upgrade flow processing data to produce post-upgrade pipeline configuration data, and the control plane uses the post-upgrade pipeline configuration data to reconfigure the packet processing pipeline circuit to process the network flow.

In some implementations of the methods and devices, the control plane uses the flow processing data to produce pre-upgrade pipeline configuration data, the control plane uses the pre-upgrade pipeline configuration data to configure the packet processing pipeline circuit to process the network flow before performing the pipeline upgrade, the control plane uses the flow processing data to produce post-upgrade pipeline configuration data, and the control plane uses the post-upgrade pipeline configuration data to reconfigure the packet processing pipeline circuit to process the network flow after performing the pipeline upgrade. In some implementations of the methods and devices, the table is stored in a pipeline memory circuit, and the pipeline memory circuit is more than half full when the pipeline upgrade is initiated. In some implementations of the methods and devices, a post-upgrade packet causes a flow miss in the packet processing pipeline circuit after the pipeline upgrade is performed, and the flow miss causes the control plane to configure the packet processing pipeline circuit to process the network flow.

In some implementations of the methods and devices, the network flow includes an interim packet and a post-upgrade packet, the network appliance receives the interim packet after performing the pipeline upgrade and before performing a control plane upgrade, the network appliance receives the post-upgrade packet after performing the pipeline upgrade and after performing the control plane upgrade, the control plane uses the flow processing data to produce a processed interim packet by processing the interim packet, the packet processing pipeline circuit produces a processed post-upgrade packet by processing the post-upgrade packet after the control plane upgrade is performed, and the processed interim packet and the processed post-upgrade packet are sent to a network destination. In some implementations of the methods and devices, performing a control plane upgrade after performing the pipeline upgrade and before reconfiguring the packet processing pipeline circuit to process the network flow. In some implementations of the methods and devices, an interim packet is received between the pipeline upgrade and the control plane upgrade, the interim packet causes the packet processing pipeline circuit to produce a flow miss, the packet processing pipeline circuit sends the flow miss for the control plane, and the control plane processes the interim packet before the control plane upgrade.

In some implementations of the methods and devices, the network appliance receives a pre-upgrade packet of the network flow, the CPU cores produce flow processing data by applying a plurality of networking rules to the pre-upgrade packet, and the CPU cores use the flow processing data to configure the packet processing pipeline circuit to process the network flow before performing the pipeline upgrade. In some implementations of the methods and devices, the packet processing pipeline circuit produces a processed post-upgrade packet by processing a post-upgrade packet after performing the pipeline upgrade, and the processed post-upgrade packet is sent to a network destination.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1A:
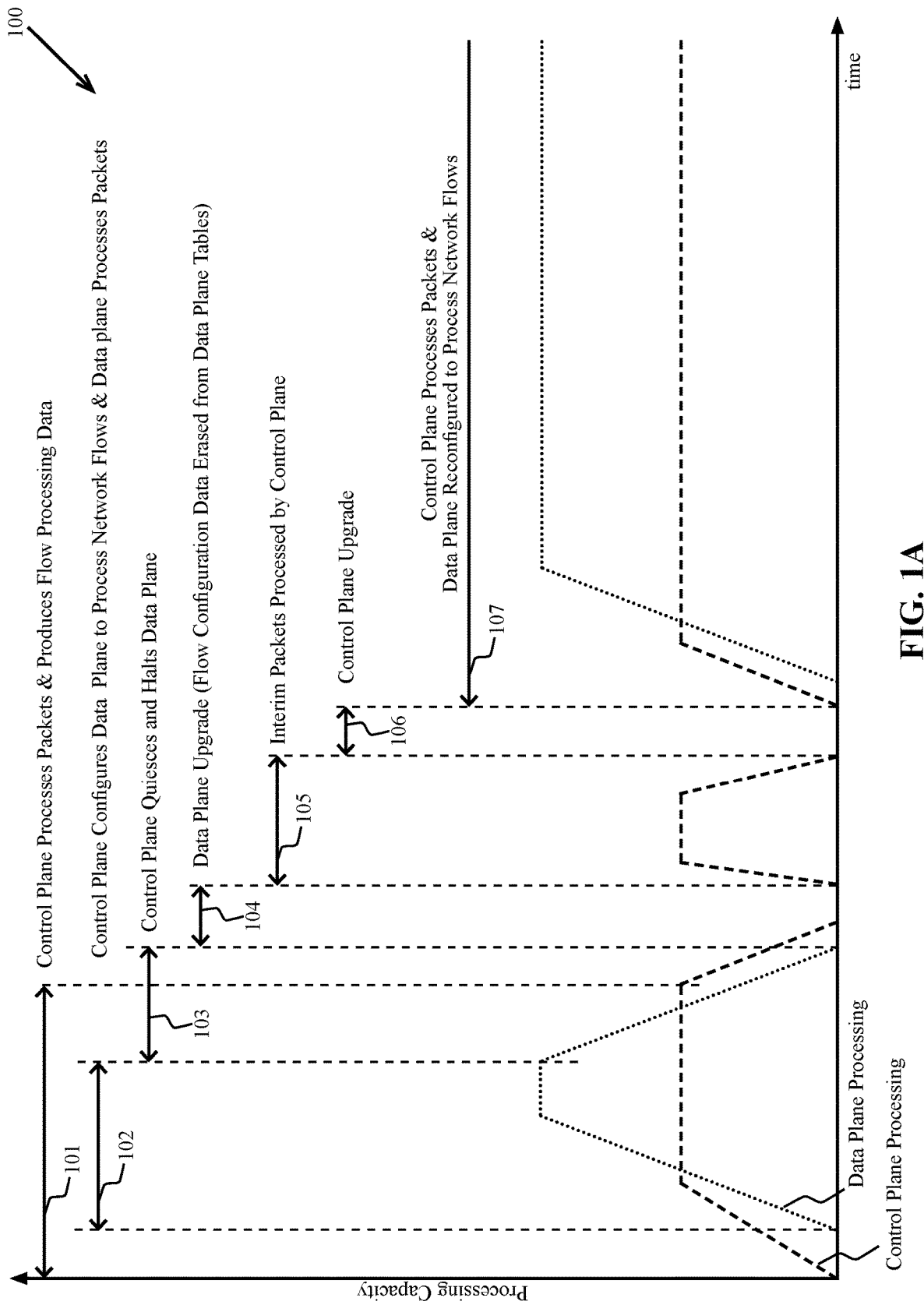
FIG. 1A and FIG. 1B are high-level timing diagrams of upgrading a data plane and a control plane according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Network appliances are often upgraded and performing the upgrades often takes the network appliances out of service. Taking a network appliance out of service, even temporarily, disrupts the network flows that the network appliance processes. As such, server workloads are forced to wait until communications are restored. Other network infrastructure must adapt (e.g., route around) or wait for communications to be restored. Providers of data warehouses and cloud computing services experience the upgrades as degradations that may impact quality of service (QoS) guarantees. The clients of those providers experience the upgrades as down time. Service providers already employ techniques such as hitless upgrades with conditional roll backs to minimize service disruptions while upgrading network appliances. Those techniques can require upgrading data structures and may be impossible to implement for network appliances that do not have enough memory to concurrently store two versions of those data structures.

A network appliance can have a control plane and a data plane. The control plane, often called the slow plane, can use networking rules (e.g., routing rules, firewall rules, etc.) for determining what actions should be taken when processing a packet. When a packet is received for an unknown network flow, the control plane can apply networking rules to that packet and thereby determine what actions are needed for processing all the packets in that network flow. The control plane can then configure the data plane to perform those actions to process that network flow. Over time, the control plane applies the networking rules to many network flows and configures the data plane for each of those flows. The data plane simply performs the actions that it is configured to take. As such, the data plane, also called the fast plane, can process packets for known network flows much faster than the control plane because the data plane has been configured to process those known network flows.

The data plane can include a packet processing pipeline circuit that uses a pipeline memory. The pipeline memory can be a pipeline memory circuit that stores configuration data such as a flow table. The control plane can configure the data plane to process a network flow by storing data for that particular network flow in the flow table. Pipeline memory can be an expensive and limited resource that is implemented within an application specific integrated circuit (ASIC), as a special type of memory such as ternary content-addressable memory (TCAM), etc. During normal operation, a nearly full pipeline memory is desirable because such memory usage indicates that precious resources are being used instead of being wasted by being unused. However, if a single version of the flow table consumes more than half the pipeline memory then the pipeline memory cannot store two versions of a flow table. As such, the network appliance cannot be upgraded via an upgrade technique requiring two versions of a large flow table to be concurrently stored in pipeline memory. One solution is to clear the data plane memory as part of the or along with upgrading the data plane. Clearing the data plane memory causes the data plane to lose configuration for processing the network flows. The control plane can reconfigure the data plane to process the network flows after the upgrade by, for example, installing new entries in an upgraded flow table. The newly installed entries in the upgraded flow table are thereby properly formatted for use by the upgrade packet processing pipeline circuit in the data plane.

The control plane can be upgraded separately from the data plane. In fact, the data plane can process packets for known flows while the control plane is being upgraded. Before the control plane upgrade, the control plane configures the data plane to process packets for known flows. The data plane can process packets for those known flows without the further involvement of the control plane. As such, the data plane continues processing packets for those known flows during the control plane upgrade. After the control plane upgrade, the control plane may resume configuring the data plane to process network flows such as new flows. The network appliance is not restarted during the upgrade process. Instead, the data plane and the control plane are separately upgraded via a pipeline upgrade and a control plane upgrade.

The advantages of separately upgrading the data plane and the control plane without restarting the network appliance include reductions in network disruption. One advantage is that the data plane can be upgraded without restarting the network appliance even when the pipeline memory is substantially full. Another advantage is that the network appliance can continue processing network packets while the control plane is quiesced and while the control plane is being upgraded. Another advantage is that network flows can be processed during upgrades such that network communications are not fully disrupted. As such, client workloads are not taken offline due to disrupted communications while the network appliance is upgraded. Another advantage is that pipeline upgrades can be performed without requiring the pipeline memory to be large enough to store two versions of certain data structures. Furthermore, QoS obligations may still be met during upgrades. In particular, a guaranteed uptime may be unaffected because the network appliance may never be fully offline during an upgrade.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

Figure 1B:
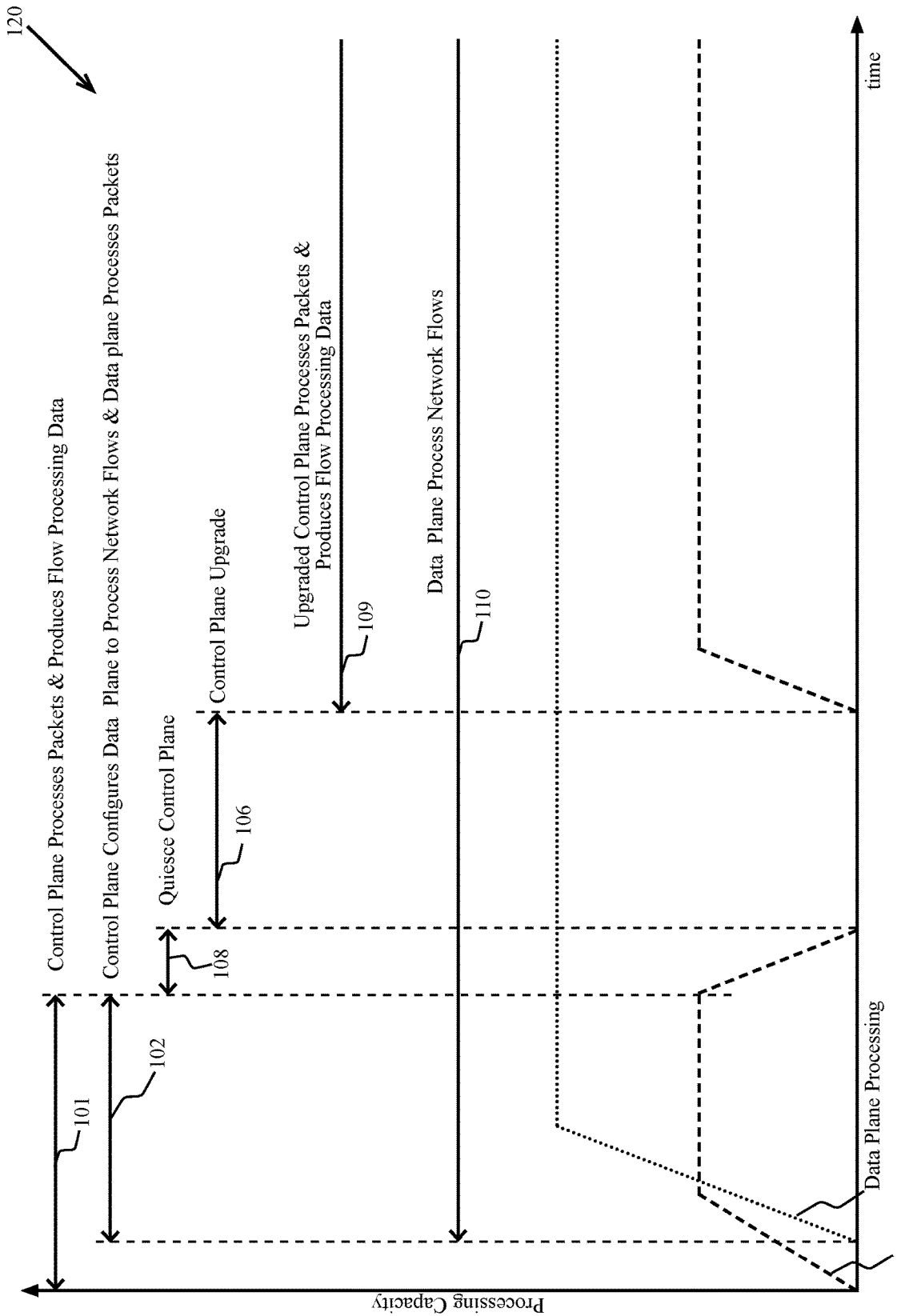

FIG. 1A and FIG. 1B are high-level timing diagrams of upgrading a data plane and a control plane according to some aspects. FIGS. 1A and 1B show time periods that indicate amounts of packet processing performed by the control plane and the data plane. The amount of processing is indicated on the vertical axis and time is on the horizontal axis. Many of the time periods overlap because the control plane and the data plane operate concurrently.

FIG. 1A is a timing diagram 100 illustrating a pipeline upgrade followed by a control plane upgrade. During a first time period 101, the control plane processes network packets and produces flow processing data. The flow processing data can be used to configure the data plane to process packets. During a second time period 102, the control plane configures the data plane to process specific network flows and the data plane then produces processed packets by processing the network packets of those specific network flows. The processing of those specific network flows has therefore been off loaded from the control plane to the data plane. For example, the network appliance can receive the first network packet of an unknown network flow. That first packet causes a flow miss in the data plane because the data plane is not configured to process packets of the new flow. Due to the flow miss, the data plane forwards that first network packet to the control plane. The control plane can produce a processed packet by processing that first network packet. While processing that packet, the control plane can apply networking rules (e.g., routing rules, firewall rules, load balancing rules, etc.) to the packet and can generate flow processing data that indicates the actions taken to process the packet. The flow processing data can be used to produce network flow configuration data. Writing the network flow configuration data into the table can configure the data plane to process the unknown network flow. For example, the table can be stored in a pipeline memory used by a packet processing pipeline circuit in the data plane. As such, the network flow configuration data can be pipeline configuration data that is stored in the table. The pipeline configuration data is pre-upgrade pipeline configuration data when it is produced before the pipeline upgrade. After such configuration, an unknown network flow becomes a known network flow that may be fully processed by the data plane. A packet for a known network flow may be processed completely by the data plane.

During a third time period 103, the control plane quiesces and halts the data plane as preparation for performing a pipeline upgrade. Quiescing the data plane can include allowing the data plane to finish processing the packets it has already begun processing without beginning to process additional packets. As such, the data plane empties of packets that are in process. After the data plane runs out of packets to process, it can be halted. Halting the pipeline can include the control plane setting a control bit, a register value, or some other parameter of the data plane that causes the data plane to stop using the table storing the network flow configuration data (e.g., P4 pipeline stops using flow tables stored in pipeline memory circuit). The table storing the network flow configuration data may be cleared as part of the pipeline upgrade after the data plane stops using the table storing the network flow configuration data. Halting the data plane can also cause the control plane to stop processing network packets because the control plane receives packets via the data plane. During a fourth time period 104, a pipeline upgrade is performed. The pipeline upgrade upgrades the data plane. While halted, the data plane does not provide packets to the control plane. As such, the control plane also stops processing network packets during the pipeline upgrade. The table storing network flow configuration data can be cleared while performing the pipeline upgrade. A pipeline memory can be cleared while performing the pipeline upgrade. Clearing the pipeline memory clears tables, such as a flow table, stored in the pipeline memory and thereby causes the packet processing pipeline circuit to lose configuration for processing network flows. Clearing the table can be considered part of the pipeline upgrade when the table is cleared after starting to quiesce and halt the data plane and before restarting the data plane at the beginning of the fifth time period 105. For example, the pipeline memory can be cleared, thereby clearing the table, at the end of the fourth time period 104.

After the pipeline upgrade is performed, the data plane can be restarted at the start of the fifth time period 105. The control plane can process network packets, now called interim packets, during the fifth time period 105. The data plane forwards packets to the control plane without processing them because the table contains no network flow configuration data during the fifth time period 105. The control plane can produce a processed interim packet by applying the networking rules to an interim packet. Recall that the control plane produced flow processing data after a flow miss. The control plane can store a flow processing data set that includes the flow processing data for all known network flows. As such, the control plane may use the flow processing data for a known network flow to process an interim packet after determining that the interim packet is in that known network flow. If an interim packet is in an unknown network flow, the control plane can apply the networking rules to process it and to generate flow processing data for that unknown network flow.

The control plane can also be upgraded. The control plane can be upgraded during a sixth time period 106. Before being upgraded, the control plane can be quiesced by quiescing and halting various service processes being run by the control plane. For example, the control plane may be running a process that handles flow miss packets, that process may be quiesced and halted. Halting the control plane itself may be unnecessary. In fact, the CPU cores in the control plane may be required to perform the control plane upgrade which can include upgrading data structures, halting service processes, starting upgraded service processes, etc. The control plane may be unable to process a flow miss during the entire control plane upgrade or part of the control plane upgrade. For example, a process that handles flow miss packets may be left running during the control plane upgrade and may therefore process those flow miss packets during the control plane upgrade. In another scenario, the process that handles flow miss packets may be restarted during the control plane upgrade and may therefore begin processing flow miss packets before the control plane upgrade completes.

At the start of a seventh time period 107, the control plane is restarted. The data plane and control plane have both been upgraded and are both running and processing network packets. At this point, the network packets received by the network appliance are post-upgrade packets. The control plane can produce post-upgrade flow processing data by applying the networking rules to the post-upgrade packets. The control plane can use the post-upgrade flow processing data to configure the data plane to process the network flows that include those post-upgrade packets. Some of the post-upgrade packets can be for known network flows, in which case the post-upgrade flow processing data may be obtained from the flow processing data set. As such, the control plane reconfigures the data plane to process the known network flows.

The flow processing data set may be used to reload the data plane with network flow configuration data for the known network flows. The known network flows can include the network flows that were known before the upgrade is initiated and can include flows that became known during the pipeline upgrade. Alternatively, the data plane may generate flow misses for both known and unknown network flows and the control plane may configure the data plane to process network flows in response to those flow misses. The control plane may determine that a flow miss is for a known network flow and use flow processing data that is already stored in the flow processing data set to configure the data plane to process that known network flow.

FIG. 1B is a timing diagram 120 illustrating a control plane upgrade that may be performed independently of a pipeline upgrade. As such, the data plane can continue processing known network flows while the control plane is upgraded. During a first time period 101, the control plane processes network packets and produces flow processing data. During a second time period 102, the control plane configures the data plane to process specific network flows and the data plane then produces processed packets by processing the network packets of those specific network flows. During an eighth time period 108 the control plane can be quiesced in preparation for a control plane upgrade. The control plane upgrade is performed during the sixth time period 106. The control plane packet processing is restarted during a ninth time period 109. During the ninth time period 109 the control plane processes packets and produces flow processing data. The table stored in pipeline memory has not been cleared because the data plane is not being upgraded. As such, the data plane can process network flows during a tenth time period that overlaps the control plane upgrade operations. While the control plane is being upgraded, it may be unable to process a flow miss. The data plane, however, is processing network packets during the control plane upgrade and may generate a flow miss. The data plane may take a special action for a flow miss during a control plane upgrade. One possible action can be putting the network packet that generated the flow miss back onto the data plane input queue. Another possible action is recirculating the network packet that caused the flow miss within the data plane's packet processing pipeline circuit. Yet another action, which may be the normal action taken for a flow miss, is to place the network packet on a control plane input queue. During normal operation, the control plane's service processes may take packets and queued tasks from the control plane input queues and then process those packets and perform those tasks. During a control plane upgrade, the packets and tasks can remain on the control plane input queues until service processes restart and begin emptying the queues.

Figure 2:
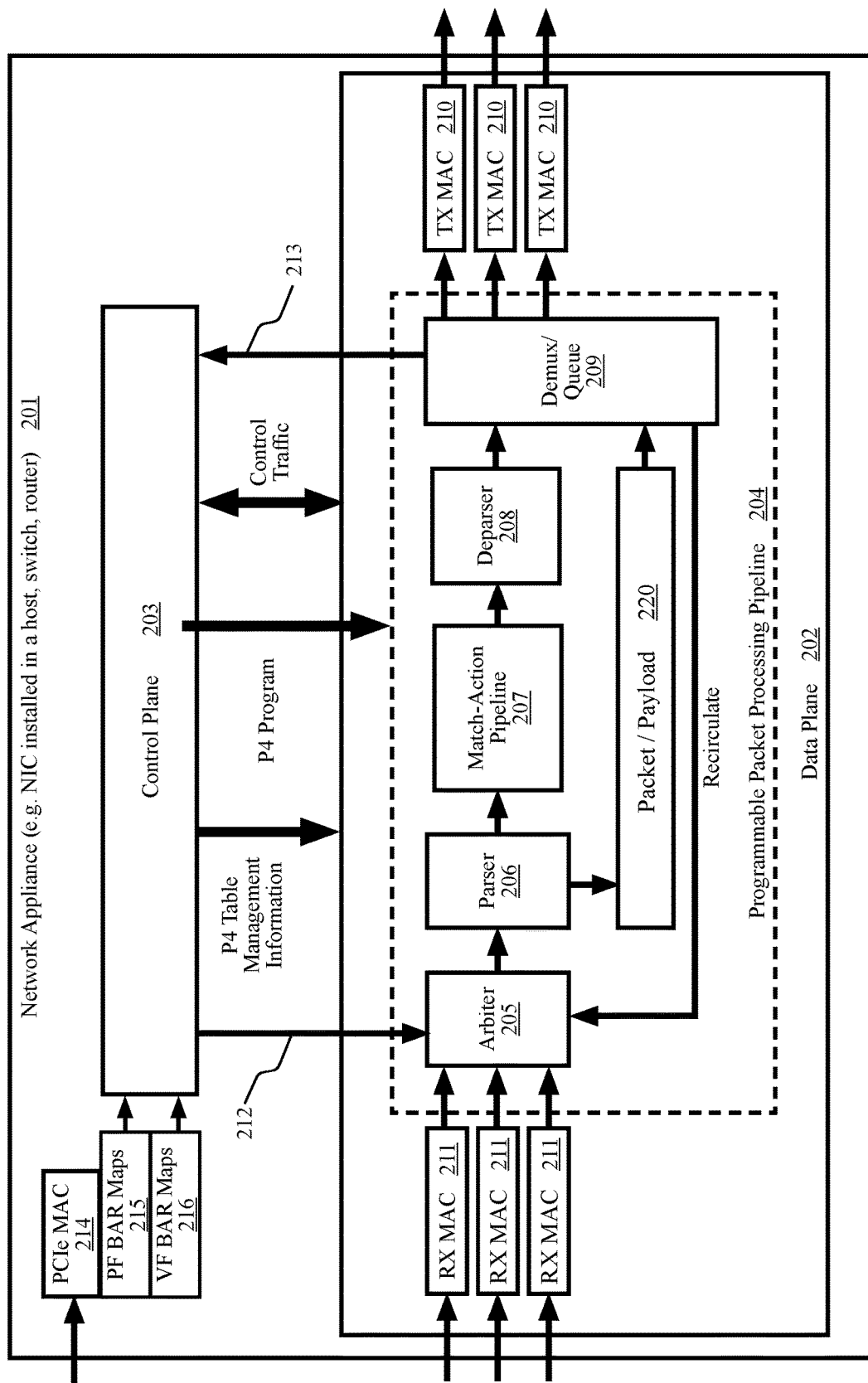
FIG. 2 is a functional block diagram of a network appliance having a control plane and a data plane and in which aspects may be implemented.

FIG. 2 is a functional block diagram of a network appliance having a control plane and a data plane and in which aspects may be implemented. A network appliance 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The document "P416 Language Specification," version 1.2.2, published by the P4 Language Consortium on May 17, 2021, which is incorporated by reference herein, describes the P4 domain-specific language that can be used for programming the data plane of network appliances. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output CPU port 213. The control plane is often referred to as a CPU (central processing unit) although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A network appliance 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 3:
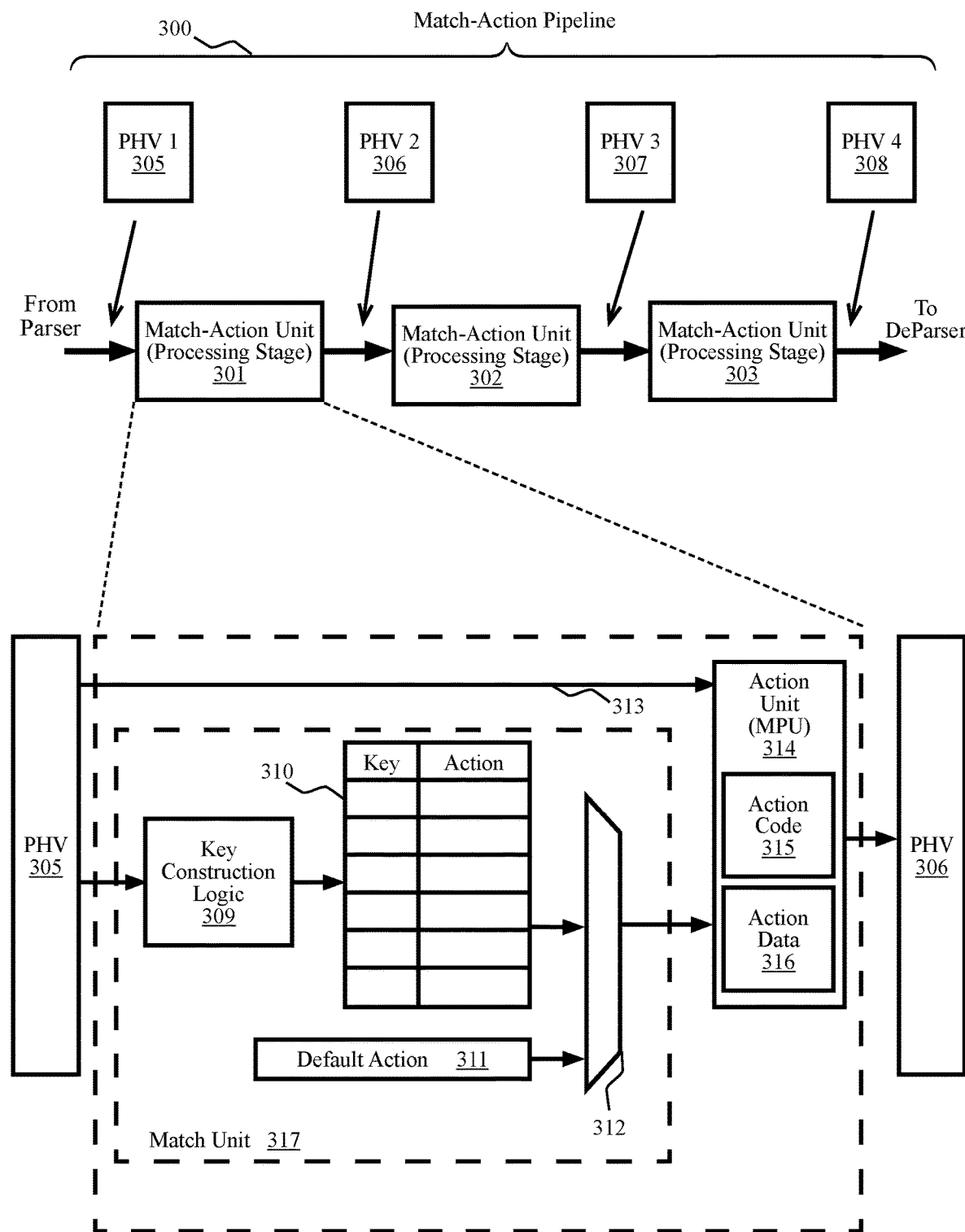
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often simply called stages, of the packet processing pipeline. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table can be managed by the control plane.

Figure 4:
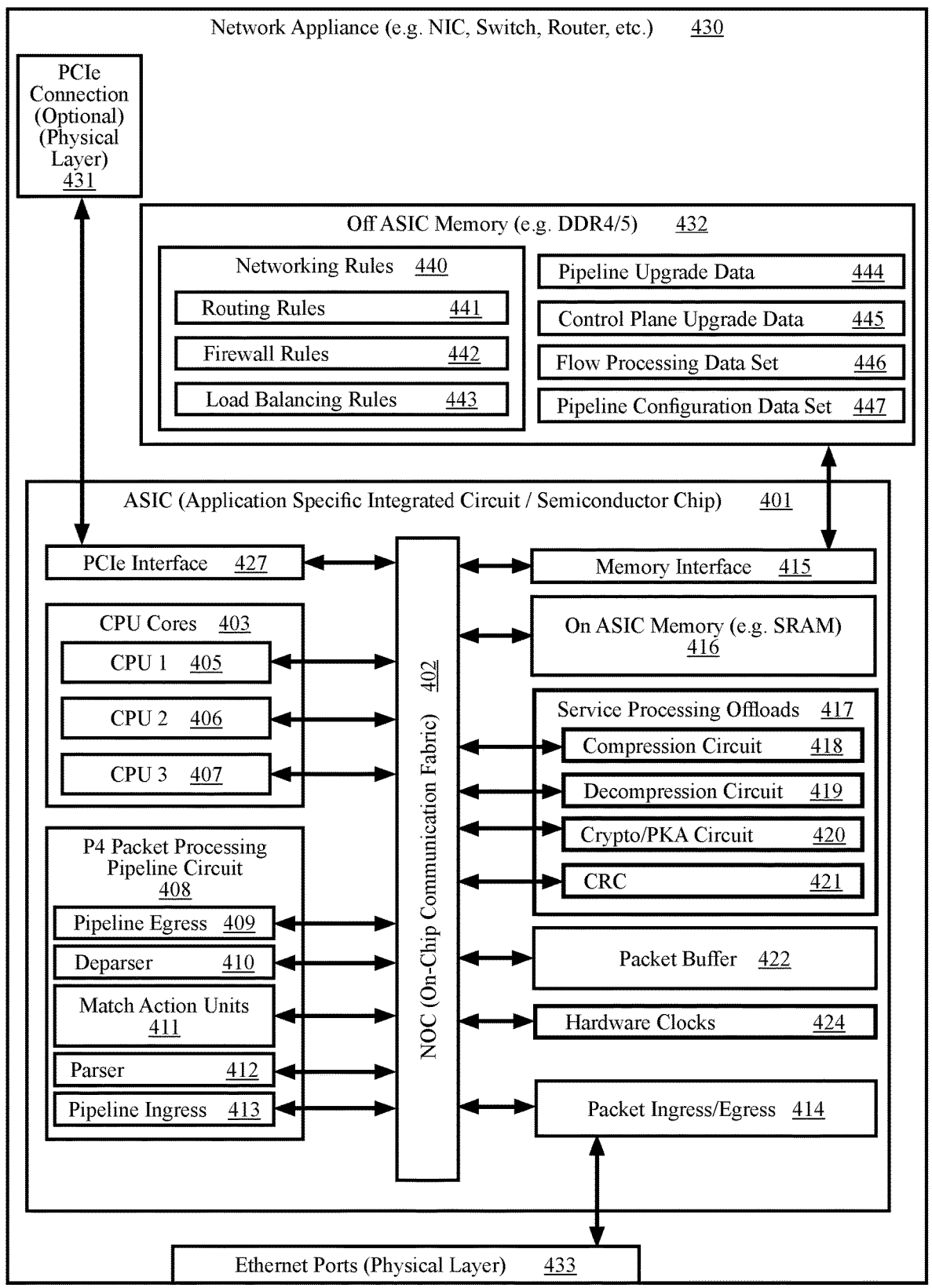
FIG. 4 is a functional block diagram of a network appliance having an application specific integrated circuit (ASIC), according to some aspects.

FIG. 4 is a functional block diagram of a network appliance 430 having an application specific integrated circuit (ASIC) 401, according to some aspects. If the network appliance is a network interface card (NIC) then the NIC can be installed in a host computer and can act as a network appliance for the host computer and for virtual machines running on the host computer. Such a NIC can have a PCIe connection 431 for communicating with the host computer. The network appliance 430 can have an ASIC 401, off ASIC memory 432, and ethernet ports 433. The off ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include a PCIe interface 427, CPU cores 403, P4 packet processing pipeline 408 elements, memory interface 415, on ASIC memory such as static random access memory (SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline circuit 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a cyclic redundancy check (CRC) calculation circuit 421. The specific core circuits implemented within the non-limiting example of ASIC 401 can be selected such that the ASIC implements many, perhaps all, of the functionality of an InfiniBand channel adapter, of an NVMe card, and of a network appliance that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The P4 packet processing pipeline circuit 408 is a specialized set of elements for processing network packets such as IP (internet protocol) packets and InfiniBand PDUs (protocol data units). The P4 pipeline can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services, upgrading the control plane, and upgrading the data plane. The network appliance can use the memory 432 to store networking rules 440, pipeline upgrade data 444, control plane upgrade data 445, a flow processing data set 446, and pipeline configuration data 447. The networking rules 440 can include routing rules 441, firewall rules 442, load balancing rules 443, and other types of networking rules.

The CPU cores 403 can be general purpose processor cores, such as ARM processor cores, microprocessor without interlocked pipelined stages (MIPS) processor cores, and/or x86 processor cores, as is known in the field. Each CPU core can include a memory interface, an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuit 408.

The packet processing pipeline circuit 408 can be a specialized circuit or part of a specialized circuit using one or more ASICs or FPGAs to implement programmable packet processing pipelines such as the programmable packet processing pipeline 204 of FIG. 2. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuit 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
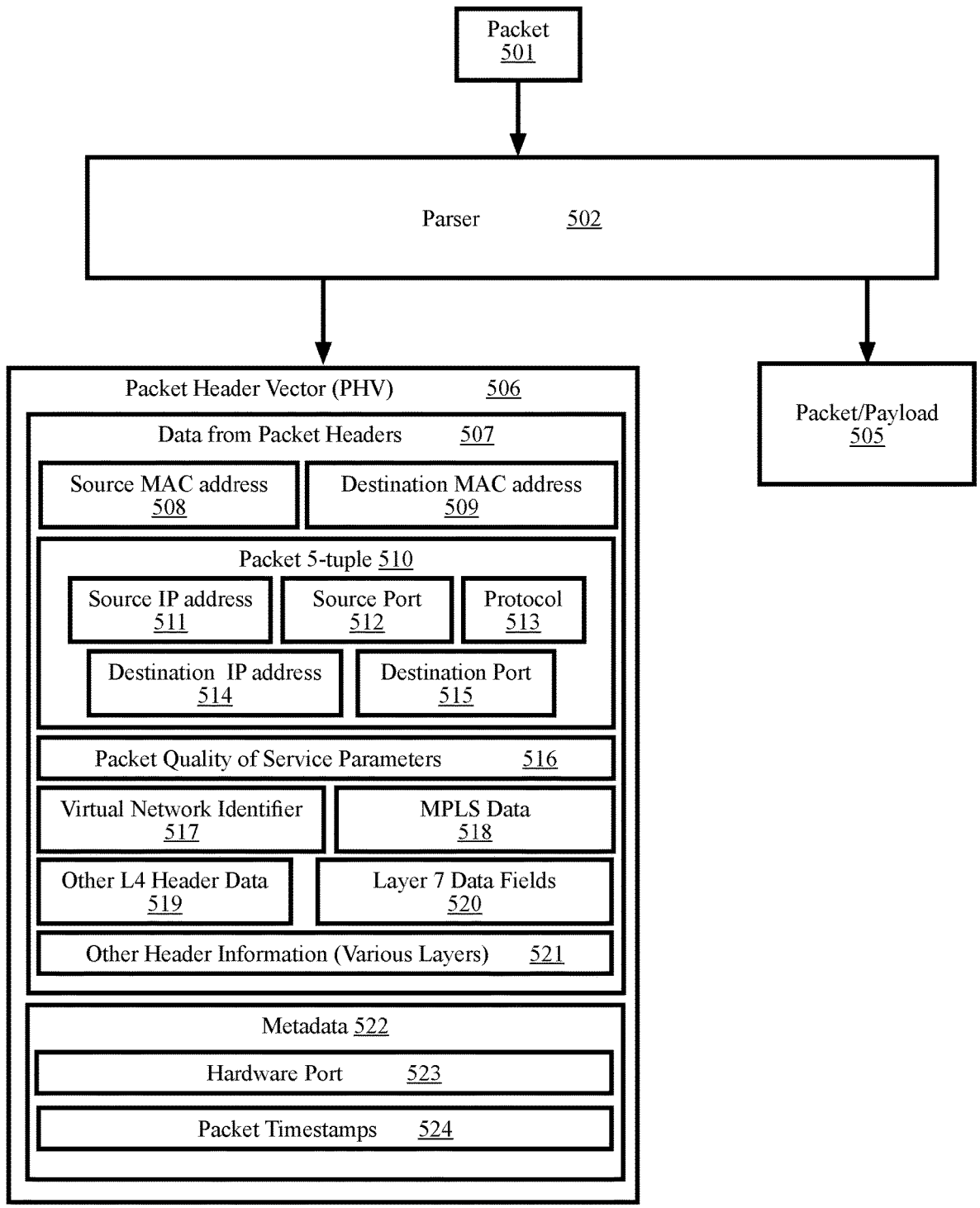
FIG. 5 is a high-level diagram illustrating an example of generating a packet header vector from a packet according to some aspects.

FIG. 5 is a high-level diagram illustrating an example of generating a packet header vector 506 from a packet 501 according to some aspects. The parser 502 can receive a packet 501 that has layer 2, layer 3, layer 4, and layer 7 headers and payloads. The parser can generate a packet header vector (PHV) from packet 501. The packet header vector 506 can include many data fields including data from packet headers 507 and metadata 522. The metadata 522 can include data generated by the network appliance such as the hardware port 523 on which the packet 501 was received and the packet timestamps 524 indicating when the packet 501 was received by the network appliance, enqueued, dequeued, etc.

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The virtual network identifier 517 may be obtained from the packet's layer 2 header. The multi-protocol label switching (MPLS) data 518, such as an MPLS label, may be obtained from the packet's layer 2 header. The other layer 4 data 519 can be obtained from the packet's layer 4 header. The L7 data fields 520 can be obtained from the packet's layer 7 header or layer 7 payload. The L7 data fields 520 can be obtained from the packet's layer 7 header or layer 7 payload. The other header information 521 is the other information contained in the packet's layer 2, layer 3, layer 4, and layer 7 headers.

The packet 5-tuple 510 is often used for generating keys for match tables, discussed below. The packet 5-tuple 510 can include the source IP address 511, the source port 512, the protocol 513, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
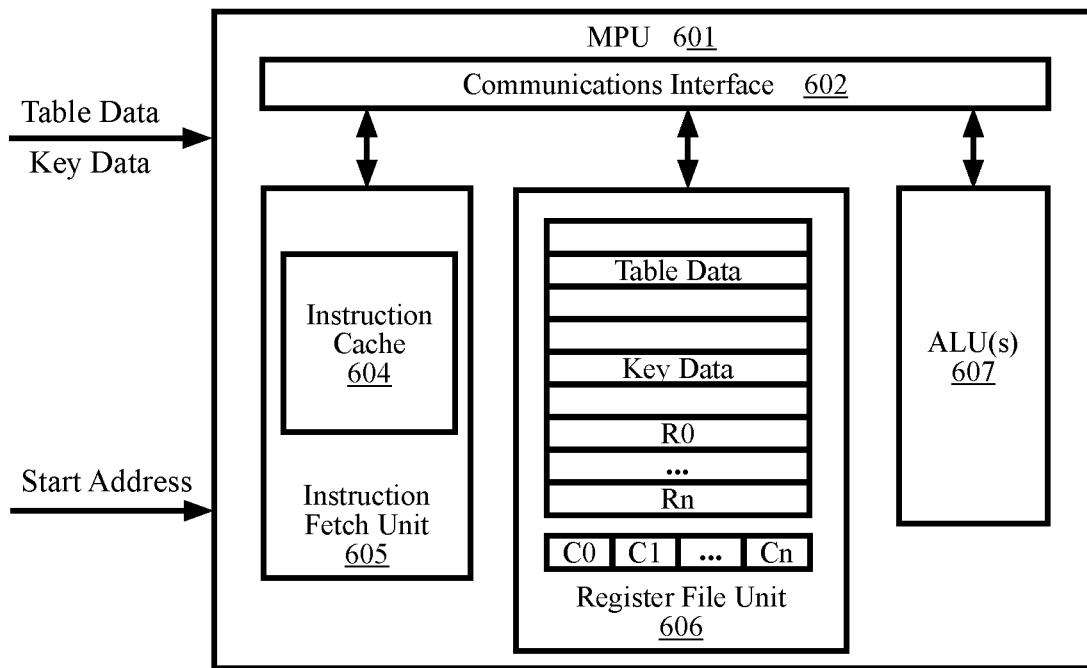
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action unit.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit

606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
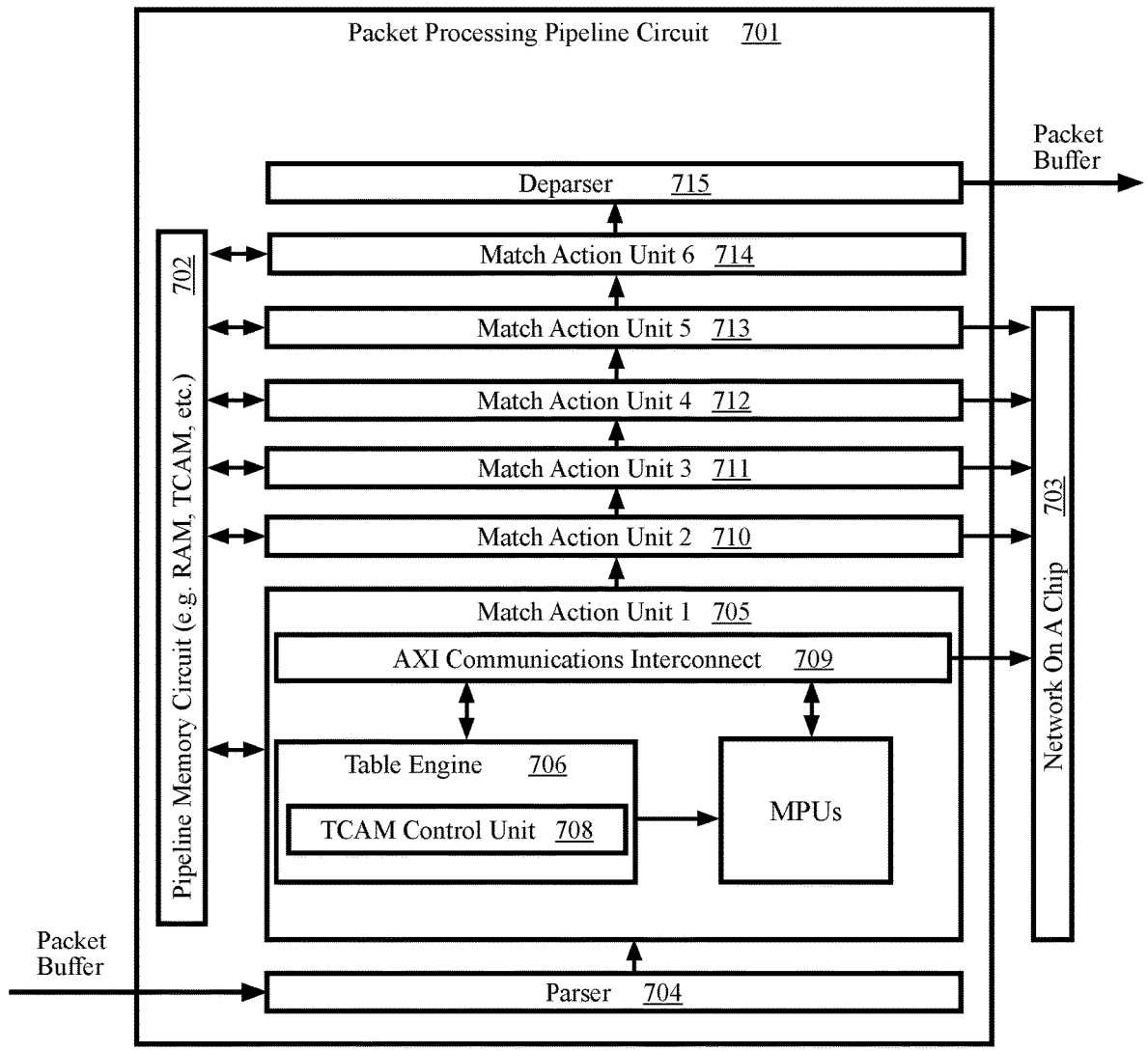
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through processing stages (e.g., processing stages 705, 710, 711, 712, 713, 714) of the match-action pipeline. Each pipeline stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The network appliance 430 of FIG. 4 has a P4 pipeline that can be implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-action units 705, 710, 711, 712, 713, 714 can be the same as the MPU 601 of FIG. 6. Match-action units can have any number of MPUs. The match-action units of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action units such as the six units illustrated in the example of FIG. 7. In practice, a match-action pipeline can have any number of match-action units. The match-action units can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

Figure 8:
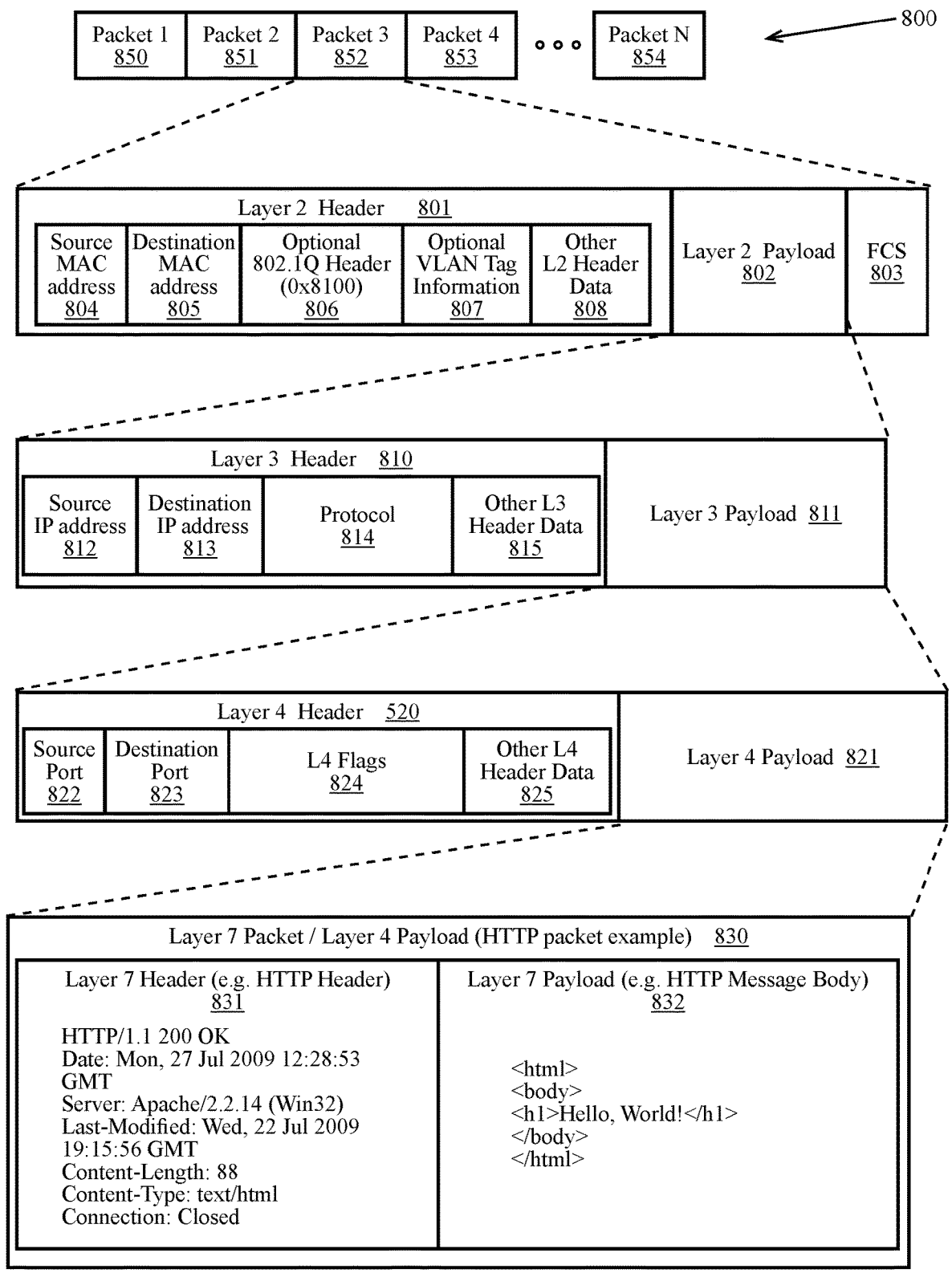
FIG. 8 illustrates packet headers and payloads of packets for network traffic flows including layer 7 fields according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a network appliance 201 can have MAC addresses. A network appliance 201 can have a MAC address that is applied to all or some of the ports. Alternatively, a network appliance may have one or more ports that each have their own MAC address. In general, each port can send and receive packets. As such, a port of a network appliance can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 201. Internet protocol (IP) is a commonly used layer 3 protocol. The layer 3 packet can have a layer 3 header 810 and a layer 3 payload 811. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet can have a layer 4 header 820 and a layer 4 payload 821. The layer 4 header 820 can include a source port 822, destination port 823, layer 4 flags 824, and other layer 4 header data 825. The source port and the destination port can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. A layer 7 packet can have a layer 7 header 831 and a layer 7 payload 832. The illustrated layer 7 packet is an HTTP packet. The layer 7 header 831 is an HTTP header, and the layer 7 payload 832 is an HTTP message body. The HTTP message body is illustrated as a hypertext markup language (HTML) document. HTTP is specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when servers consistently respond by providing HTML documents.

Figure 9:
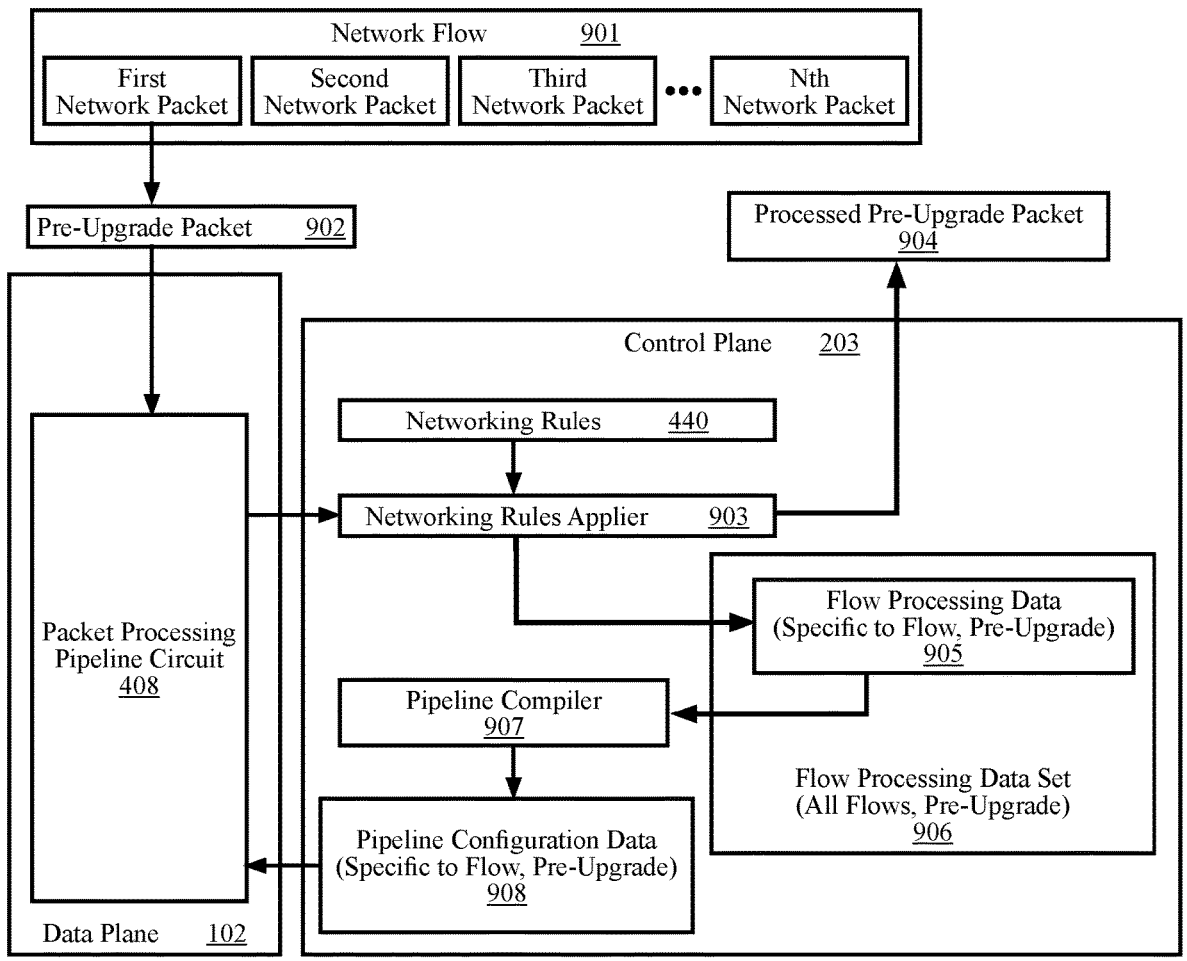
FIG. 9 illustrates a control plane configuring a packet processing pipeline circuit in a data plane to process a network flow according to some aspects.

FIG. 9 illustrates a control plane 203 configuring a packet processing pipeline circuit 408 in a data plane 202 to process a network flow according to some aspects. A network flow 901 can have many packets such as a first network packet, a second network packet, a third network packet, an Nth network packet, etc. A network appliance can receive the first network packet of the network flow 901. The first network packet can be a pre-upgrade packet 902 because it is received before a pipeline upgrade is started. The packet processing pipeline circuit 408 can receive the pre-upgrade packet 902 and can generate a flow miss because the network flow 901 is an unknown network flow when the first network packet is received. The flow miss, which may include or be associated with the first network packet, is sent to the control plane 203. The control plane can include a networking rules applier 903 that can apply the networking rules 440 to the first networking packet. Networking rules can be applied to a packet by determining which of the networking rules are for the packet and by applying those rules to the packet. A processed pre-upgrade packet 904 can be produced by applying the networking rules to the pre-upgrade packet 902. The processed pre-upgrade packet 904 can be sent to a network destination such as that specified by a destination IP address. The networking rules applier 903 can also produce flow processing data 905 that are specific to the network flow 901. The flow processing data 905 can indicate the actions that are to be taken to process the rest of the network packets of the network flow 901. The flow processing data 905 can be stored in a flow processing data set 906. The flow processing data set 906 can include flow processing data for all the network flows that are known by the network appliance. The flow processing data 905 can be processed by a pipeline compiler 907 to produce pipeline configuration data 908 that is specific to the network flow 901. The pipeline configuration data 908 can be used to configure the packet processing pipeline to process the network flow 901. Once so configured, the packet processing pipeline may process the packets of the network flow 901 without requiring further involvement of the control plane 203. The packet processing pipeline thereby produces processed packets by processing network packets.

The control plane 203 can have CPU cores 403 that execute service processes. The service processes can include the networking rules applier 903. The service processes can also include a process that uses the pipeline configuration data to configure the packet processing pipeline circuit to process the packets of known network flows. The CPU cores can also execute processes that quiesce the data plane, quiesce the packet processing pipeline circuit, upgrade the data plane, upgrade the packet processing pipeline circuit, initialize the pipeline memory during a pipeline upgrade, and reload the packet processing pipeline circuit with the known network flows. Reloading the packet processing pipeline circuit with the known network flows can include using the flow processing data for all or many of the known network flows to produce a pipeline configuration data set that includes pipeline configuration data for all or many of the known network flows. The pipeline configuration data set may then be written into the pipeline memory or otherwise used to configure the packet processing pipeline circuit to process all or many of the known network flows.

Figure 10:
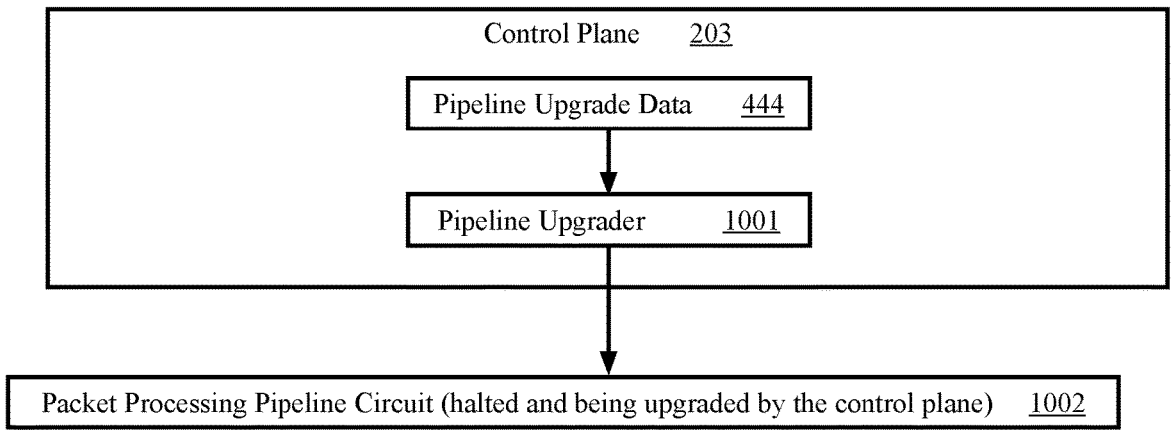
FIG. 10 illustrates a control plane upgrading a packet processing pipeline circuit according to some aspects.

FIG. 10 illustrates a control plane 203 upgrading a packet processing pipeline circuit 1002 according to some aspects. The CPU cores in the control plane 203 may execute one or more processes that upgrade the packet processing pipeline 1002. For example, a pipeline upgrader 1001 may use pipeline upgrade data 444 to upgrade the packet processing pipeline circuit. The packet processing pipeline circuit may be upgraded by modifying the actions performed by the MPUs. The MPUs' actions can be modified by changing the code that the MPUs execute in order to perform specific actions, by adding code that the MPUs execute in order to perform new actions, by deleting executable MPU code, etc. For example, code executable by the MPUs can govern an action for rewriting a packet field (e.g., MAC address). In contrast, flow processing data and pipeline configuration data can indicate what data is to be written into a packet field while processing a packet of a specific network flow. The packet processing pipeline circuit 1002 may be halted while it is being upgraded. A pipeline upgrade may be considered complete after the MPU's actions are modified.

Figure 11:
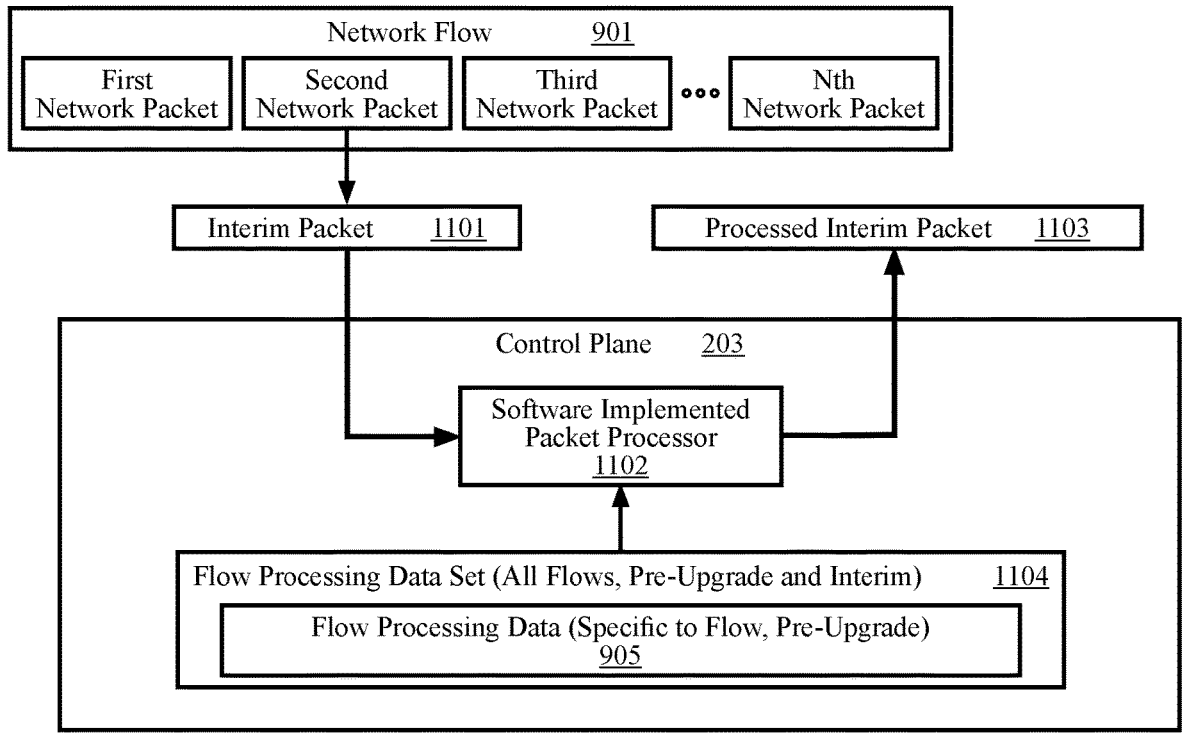
FIG. 11 illustrates a control plane processing a network flow according to some aspects.

FIG. 11 illustrates a control plane processing a network flow according to some aspects. The second packet of the network flow 901 can be an interim packet 1101 because it is received by the network appliance after a pipeline upgrade and before the control plane begins using pipeline configuration data to configure the data plane to process packets. The control plane can include a software implemented packet processor 1102. The software implemented packet processor 1102 can process the interim packet 1101 by determining that the interim packet 1101 is for a known network flow and then using the flow processing data 905 for that flow to produce a processed interim packet 1103 by processing the interim packet 1101. Alternatively, the networking rules applier 903 may be used to process the interim packet 1101. The software implemented packet processor 1102 may be a service process executed by the CPU cores. If the software implemented packet processor 1102 receives a packet for an unknown network flow, it may cause the networking rules applier 903 to process that packet and to generate flow processing data for that network flow. As such, the flow processing data set 1104 can include flow processing data for network flows that were known before the pipeline upgrade started and for network flows that became known during the pipeline upgrade. The control plane 203 may use the software implemented packet processor at any time to produce processed packets by processing network packets such as pre-upgrade packets, interim packets, and post-upgrade packets.

Figure 12:
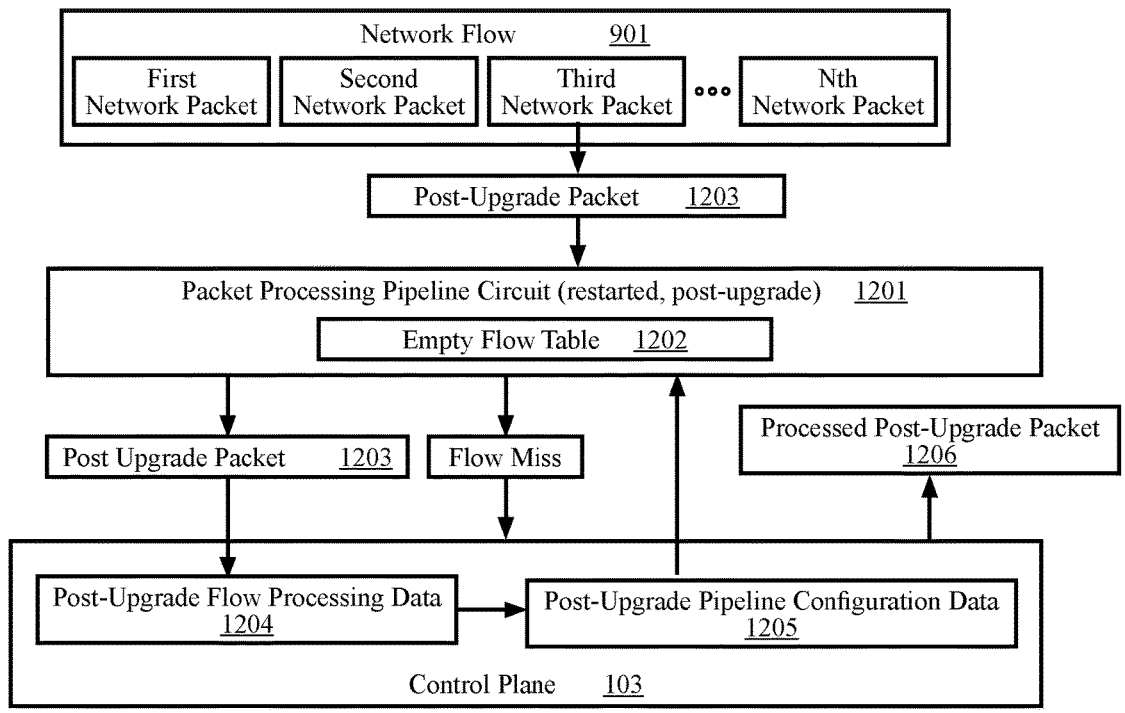
FIG. 12 illustrates a post-upgrade packet causing a flow miss according to some aspects.

FIG. 12 illustrates a post-upgrade packet 1203 causing a flow miss according to some aspects. Here, the packet processing pipeline circuit is being configured to process network flows after post-upgrade packets are received for those flows. The third network packet of the network flow 901 can be a post-upgrade packet 1203 because it is received by the network appliance after the pipeline upgrade. The packet processing pipeline circuit 1201 can be restarted (e.g., the control plane restarts the data plane) with an empty flow table 1202 after the pipeline upgrade. The flow table is a data object that can be stored in pipeline memory (e.g., the pipeline memory circuit) and may contain data for numerous network flows that indicates what data is to be written into a packet field while processing a packet of a specific network flow. The flow table may be an empty flow table 1202 directly after a pipeline upgrade because the pipeline memory may be cleared or partially cleared as part of the pipeline upgrade. Due to the empty flow table, the post-upgrade packet 1203 causes the packet processing pipeline circuit to generate a flow miss when it tries to process the post-upgrade packet 1203. The control plane can process the post-upgrade packet 1203 and can generate post-upgrade flow processing data 1204 for the network flow 901. Alternatively, the control plane can obtain the post-upgrade flow processing data 1204 from a flow processing data set 1104. The post-upgrade flow processing data 1204 can be used to produce post-upgrade pipeline configuration data 1205 that is used to configure the packet processing pipeline circuit to process the network flow 901.

Figure 13:
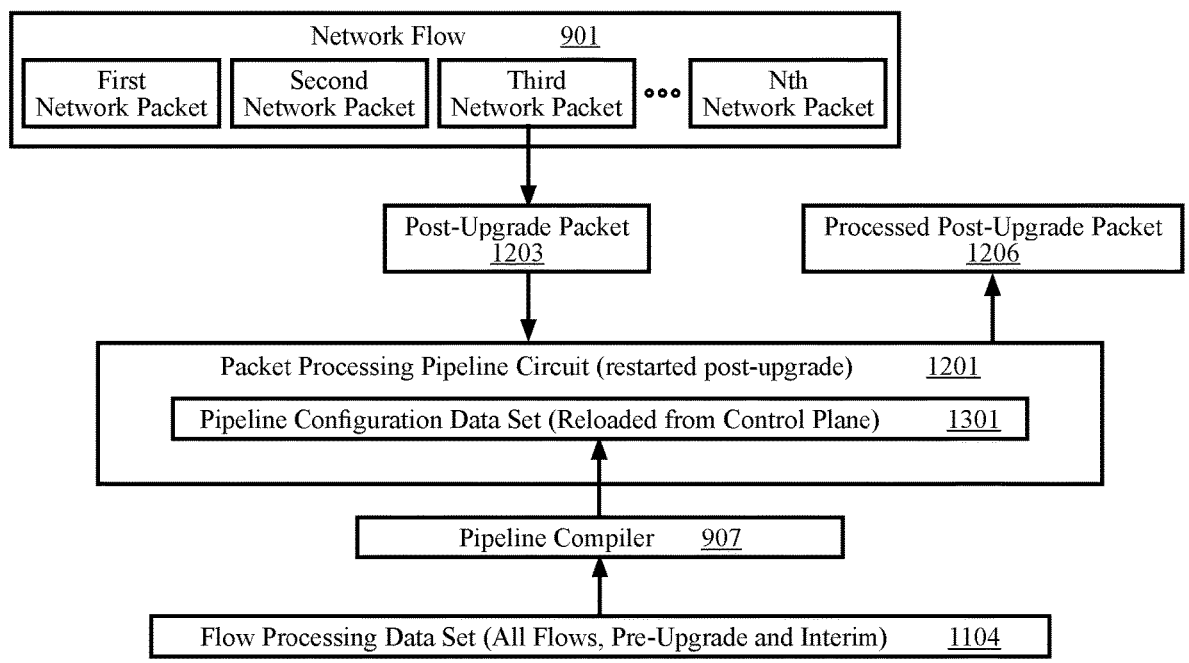
FIG. 13 illustrates a control plane reloading a packet processing pipeline circuit with pipeline configuration data according to some aspects.

FIG. 13 illustrates a control plane reloading a packet processing pipeline circuit 1201 with pipeline configuration data according to some aspects. Here, the packet processing pipeline circuit is being reloaded to process all known network flows as part of or immediately after the pipeline upgrade. All the flow processing data in the flow processing data set 1104 can be submitted to the pipeline compiler 907 to produce a pipeline configuration data set 1301 that is loaded into the packet processing pipeline circuit 1201. The packet processing pipeline circuit 1201 can be restarted after the pipeline upgrade. As such, the packet processing pipeline circuit can be reconfigured to process the network flow 901 before the post-upgrade packet 1203 is received. The packet processing pipeline circuit can produce a processed post-upgrade packet 1206 by processing the post-upgrade packet 1203.

Figure 14A:
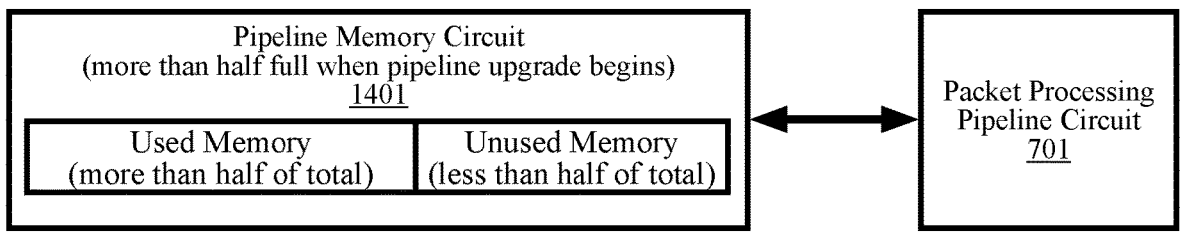
FIG. 14A, FIG. 14B and FIG. 14C are high level diagrams illustrating that a pipeline upgrade can be performed when the pipeline memory is more than half full according to some aspects.
Figure 14B:
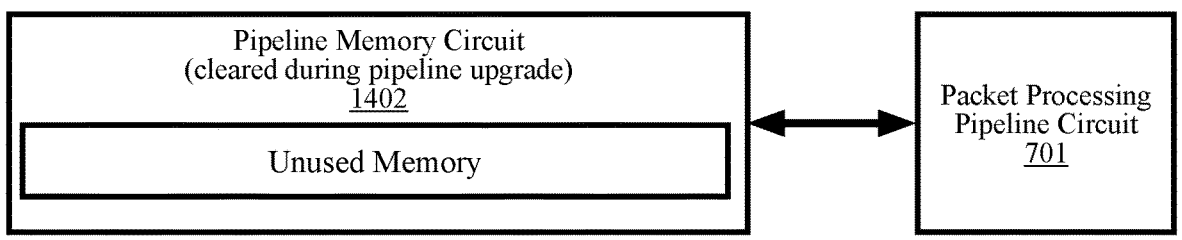
Figure 14C:
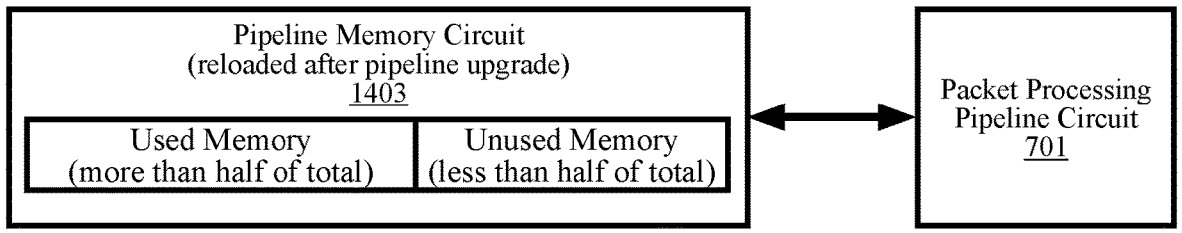

FIG. 14A, FIG. 14B and FIG. 14C are high level diagrams illustrating that a pipeline upgrade can be performed when the pipeline memory is more than half full according to some aspects. Other upgrade techniques may require that the pipeline memory be less than half full when a network appliance is upgraded because the pipeline memory must store data in a pre-upgrade format and in a post-upgrade format. When using those techniques, the pre-upgrade formatted data is retained so that it may be used if the upgrade fails and may be erased after a successful upgrade. The technique disclosed here may be performed when the pipeline memory is more than half full or is nearly full because the pipeline memory is reloaded from the control plane. If a pipeline upgrade fails, the pipeline memory can be reloaded with data in the pre-upgrade format. If a pipeline upgrade succeeds, the pipeline memory can be reloaded with data in the post-upgrade format.

FIG. 14A shows a pipeline memory 1401 that is more than half full when the pipeline upgrade begins. FIG. 14B shows that the pipeline memory 1402 has been cleared during the pipeline upgrade. FIG. 14C shows that the pipeline memory 1403 is more than half full after the pipeline upgrade because the control plane has reloaded the pipeline memory.

Figure 15:
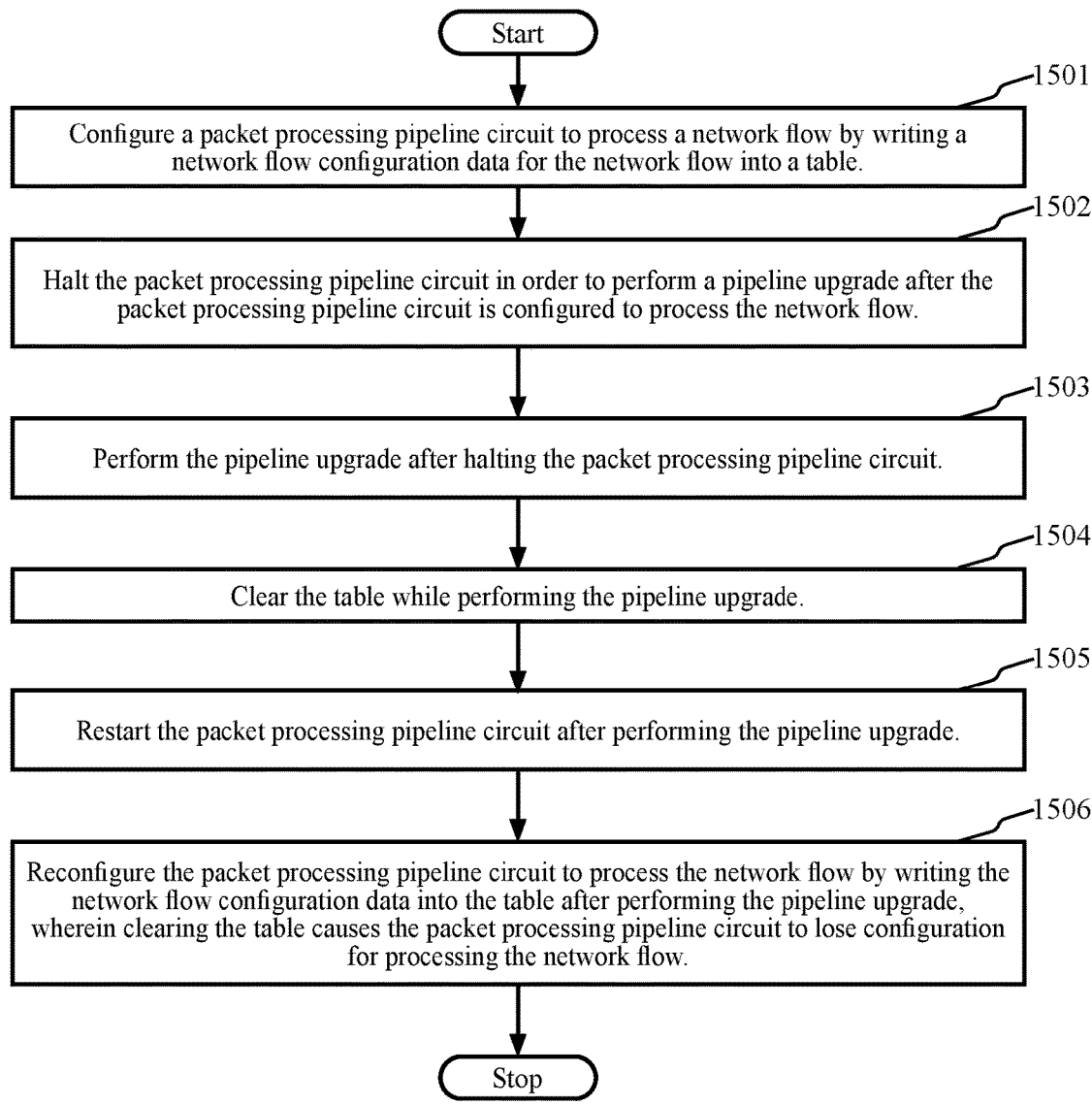
FIG. 15 is a high-level flow diagram illustrating a method for upgrading a control plane and a data plane of a network appliance according to some aspects.

FIG. 15 is a high-level flow diagram illustrating a method for upgrading a control plane and a data plane of a network appliance 1500 according to some aspects. At block 1501, the method can configure a packet processing pipeline circuit to process a network flow by writing a network flow configuration data for the network flow into a table. At block 1502, the method can halt the packet processing pipeline circuit in order to perform a pipeline upgrade after the packet processing pipeline circuit is configured to process the network flow. At block 1503, the method can perform the pipeline upgrade after halting the packet processing pipeline circuit. At block 1504, the method can clear the table while performing the pipeline upgrade. At block 1505, the method can restart the packet processing pipeline circuit after performing the pipeline upgrade. At block 1506, the method can reconfigure the packet processing pipeline circuit to process the network flow by writing the network flow configuration data into the table after performing the pipeline upgrade, wherein clearing the table causes the packet processing pipeline circuit to lose configuration for processing the network flow.

Aspects described above can be ultimately implemented in a network appliance that includes physical circuits that implement digital data processing, storage, and communications. The network appliance can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
configuring a packet processing pipeline circuit to process a network flow by writing a network flow configuration data for the network flow into a table;
halting the packet processing pipeline circuit in order to perform a pipeline upgrade after the packet processing pipeline circuit is configured to process the network flow;
performing the pipeline upgrade after halting the packet processing pipeline circuit;
clearing the table while performing the pipeline upgrade;
restarting the packet processing pipeline circuit after performing the pipeline upgrade; and
reconfiguring the packet processing pipeline circuit to process the network flow by writing the network flow configuration data into the table after performing the pipeline upgrade,
wherein clearing the table causes the packet processing pipeline circuit to lose configuration for processing the network flow.

2. The method of claim 1, wherein:
a network appliance includes the packet processing pipeline circuit and a control plane;
the network appliance receives a pre-upgrade packet of the network flow;
the control plane produces flow processing data by applying a plurality of networking rules to the pre-upgrade packet; and
the control plane uses the flow processing data to configure the packet processing pipeline circuit to process the network flow before performing the pipeline upgrade.

3. The method of claim 2, wherein:
the network appliance receives an interim packet after performing the pipeline upgrade and before performing a control plane upgrade; and
the control plane uses the flow processing data to process the interim packet.

4. The method of claim 2, wherein:
the control plane uses the flow processing data to reconfigure the packet processing pipeline circuit to process the network flow after performing the pipeline upgrade.

5. The method of claim 2, wherein:
after performing the pipeline upgrade, the control plane produces post-upgrade flow processing data by applying the networking rules to a post-upgrade packet of the network flow; and
the control plane uses the post-upgrade flow processing data to reconfigure the packet processing pipeline circuit to process the network flow.

6. The method of claim 5, wherein:
the control plane uses the post-upgrade flow processing data to produce post-upgrade pipeline configuration data; and
the control plane uses the post-upgrade pipeline configuration data to reconfigure the packet processing pipeline circuit to process the network flow.

7. The method of claim 2, wherein:
the control plane uses the flow processing data to produce pre-upgrade pipeline configuration data;
the control plane uses the pre-upgrade pipeline configuration data to configure the packet processing pipeline circuit to process the network flow before performing the pipeline upgrade;
the control plane uses the flow processing data to produce post-upgrade pipeline configuration data; and
the control plane uses the post-upgrade pipeline configuration data to reconfigure the packet processing pipeline circuit to process the network flow after performing the pipeline upgrade.

8. The method of claim 7, wherein:
the table is stored in a pipeline memory circuit; and
the pipeline memory circuit is more than half full when the pipeline upgrade is initiated.

9. The method of claim 2, wherein:
a post-upgrade packet causes a flow miss in the packet processing pipeline circuit after the pipeline upgrade is performed; and the flow miss causes the control plane to reconfigure the packet processing pipeline circuit to process the network flow.

10. The method of claim 2, wherein:
the network flow includes an interim packet and a post-upgrade packet;
the network appliance receives the interim packet after performing the pipeline upgrade and before performing a control plane upgrade;
the network appliance receives the post-upgrade packet after performing the pipeline upgrade and after performing the control plane upgrade;
the control plane uses the flow processing data to produce a processed interim packet by processing the interim packet;
the packet processing pipeline circuit produces a processed post-upgrade packet by processing the post-upgrade packet after the control plane upgrade is performed; and
the processed interim packet and the processed post-upgrade packet are sent to a network destination.

11. The method of claim 1, further including:
performing a control plane upgrade after performing the pipeline upgrade and before reconfiguring the packet processing pipeline circuit to process the network flow.

12. The method of claim 11, wherein:
an interim packet is received between the pipeline upgrade and the control plane upgrade;
the interim packet causes the packet processing pipeline circuit to produce a flow miss;
the packet processing pipeline circuit sends the flow miss for the control plane; and
the control plane processes the interim packet before the control plane upgrade.

13. A network appliance comprising:
a control plane that includes a plurality of CPU cores; and
a data plane that includes a packet processing pipeline circuit,
wherein
the control plane configures the packet processing pipeline circuit to process a network flow by writing a network flow configuration data for the network flow into a table,
the control plane halts the packet processing pipeline circuit in order to perform a pipeline upgrade,
the control plane performs the pipeline upgrade while the packet processing pipeline circuit is halted,
the pipeline upgrade includes clearing the table,
the control plane restarts the packet processing pipeline circuit after performing the pipeline upgrade,
the control plane reconfigures the packet processing pipeline circuit to process the network flow after performing the pipeline upgrade,
the pipeline upgrade is performed after the packet processing pipeline circuit is configured to process the network flow, and
clearing the table causes the packet processing pipeline circuit to lose configuration for processing the network flow.

14. The network appliance of claim 13, wherein:
the network appliance receives a pre-upgrade packet of the network flow;
the CPU cores produce flow processing data by applying a plurality of networking rules to the pre-upgrade packet; and
the CPU cores use the flow processing data to configure the packet processing pipeline circuit to process the network flow before performing the pipeline upgrade.

15. The network appliance of claim 14, wherein:
the network appliance receives an interim packet after the pipeline upgrade and before a control plane upgrade; and
the control plane uses the flow processing data to process the interim packet.

16. The network appliance of claim 14, wherein:
the control plane uses the flow processing data to reconfigure the packet processing pipeline circuit to process the network flow after performing the pipeline upgrade.

17. The network appliance of claim 14, wherein:
after performing the pipeline upgrade, the control plane produces post-upgrade flow processing data by applying the networking rules to a post-upgrade packet of the network flow; and
the control plane uses the post-upgrade flow processing data to reconfigure the packet processing pipeline circuit to process the network flow.

18. The network appliance of claim 13, wherein:
a post-upgrade packet causes a flow miss in the packet processing pipeline circuit after the pipeline upgrade is performed; and
the flow miss causes the control plane to reconfigure the packet processing pipeline circuit to process the network flow.

19. The network appliance of claim 13, wherein:
the packet processing pipeline circuit produces a processed post-upgrade packet by processing a post-upgrade packet after performing the pipeline upgrade; and
the processed post-upgrade packet is sent to a network destination.

20. A system comprising:
a pipeline configuration means for configuring a packet processing pipeline circuit to process a network flow;
a pipeline upgrade means for performing a pipeline upgrade that upgrades the packet processing pipeline circuit;
a means for halting the packet processing pipeline circuit while performing the pipeline upgrade; and
a means for restarting the packet processing pipeline circuit after performing the pipeline upgrade
wherein
the pipeline configuration means configures the packet processing pipeline circuit to process the network flow before the pipeline upgrade is performed,
performing the pipeline upgrade results in the packet processing pipeline circuit being not configured to process the network flow, and
the pipeline configuration means reconfigures the packet processing pipeline circuit to process the network flow after the pipeline upgrade is performed.

* * * * *